(12) United States Patent
Durst et al.

(10) Patent No.: US 8,529,675 B2
(45) Date of Patent: *Sep. 10, 2013

(54) AIR FILTER SYSTEM

(75) Inventors: Michael Durst, Frankenhardt (DE);
Nikolaus Moser, Ditzingen, DE (US);
Andreas Pelz, Markgroeningen (DE);
Olaf Weber, Rochester Hills, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/280,307

(22) Filed: Nov. 17, 2005

(65) Prior Publication Data
US 2006/0130659 A1    Jun. 22, 2006

(30) Foreign Application Priority Data
Nov. 17, 2004   (DE) .................. 10 2004 000 044

(51) Int. Cl.
*B01D 59/26* (2006.01)
(52) U.S. Cl.
USPC ............... 96/134; 96/136; 96/133; 96/135; 55/483; 55/523; 95/154
(58) Field of Classification Search
USPC .................... 96/133, 134–142; 55/483, 523; 422/120; 95/154
See application file for complete search history.

(56) References Cited

U.S. PATENT DOCUMENTS

| | | | | |
|---|---|---|---|---|
| 4,227,904 | A  * | 10/1980 | Kasmark et al. | 96/139 |
| 6,149,703 | A  * | 11/2000 | Parker | 55/502 |
| 6,692,551 | B2 * | 2/2004 | Wernholm et al. | 95/146 |
| 6,712,884 | B2 * | 3/2004 | Bruck et al. | 95/268 |
| 6,912,847 | B2 * | 7/2005 | Deeba | 60/297 |
| 7,189,375 | B2 * | 3/2007 | Molinier et al. | 422/171 |
| 7,235,124 | B2 * | 6/2007 | Liu et al. | 96/154 |
| 7,407,533 | B2 * | 8/2008 | Steins | 96/134 |
| 2002/0150805 | A1 * | 10/2002 | Stenersen et al. | 429/34 |
| 2003/0066427 | A1 * | 4/2003 | Ishida | 96/135 |
| 2004/0011197 | A1 * | 1/2004 | Wernholm et al. | 95/90 |
| 2004/0072050 | A1 * | 4/2004 | Miura et al. | 429/34 |
| 2005/0028672 | A1 * | 2/2005 | Hickerson et al. | 95/90 |
| 2006/0042209 | A1 * | 3/2006 | Dallas et al. | 55/524 |
| 2006/0162704 | A1 * | 7/2006 | Hagler et al. | 123/518 |

OTHER PUBLICATIONS

The American Heritage Dictionary of the English Language: Fourth Edition 2000.*
Webster's Third New International Dictionary p. 1086, 1981.*

* cited by examiner

*Primary Examiner* — Jason M Greene
*Assistant Examiner* — Anthony Shumate
(74) *Attorney, Agent, or Firm* — James Hasselbeck

(57) ABSTRACT

An air filter system with an air filter element having an inflow and an outflow face and comprising alternating flat and pleated layers, which are configured to form channels. The channels are alternately sealed in inflow and outflow direction, such that the medium to be filtered must pass through one of the layers as it flows from the inflow face through the filter to the outflow face. An adsorber element made of an activated carbon coated honeycomb structure is disposed adjacent the air filter element.

4 Claims, 2 Drawing Sheets

AIR FILTER SYSTEM

BACKGROUND OF THE INVENTION

The present invention relates to an air filter system comprising an air filter element having an inflow face and an outflow face and comprising alternating flat and pleated layers which form alternately sealed channels, and particularly to an air filter system of the foregoing type for use with an internal combustion engine.

An essential development goal in modern internal combustion engines is to reduce emission of harmful substances. Until now, the development activities focused primarily on optimizing the exhaust emission control system. Modern exhaust emission control systems meanwhile achieve conversion rates for harmful substances greater than 97%. Increasing air pollution has led most countries to limit emissions and to continue to tighten these limits. To assure reproducibility and comparability, various test methods, ratings and limits have been developed. In the United States, for example, the limits include the category ULEV (Ultra Low Emission Vehicle) and the currently strictest category SULEV (Super Ultra Low Emission Vehicle). To filter the air used for combustion in internal combustion engines, air filter systems, particularly with filter elements for axial end face inflow, are known in the art. These filters are wound, for example, from filter layers that are alternately flat and wave-shaped. This creates channels, which are alternately sealed and thereby force the air to flow through the filter medium. As a result, the medium to be filtered enters the inlet side of the filter through channels that are open on the end face and within the filter element switches into adjoining channels that are open on the outflow face. This causes the fluid to be filtered.

Published German patent application no. DE 100 63 789 A1, for example, discloses a filter element for end face inflow, which has triangular channels that are alternately sealed such that as the fluid to be filtered flows from an inflow face to an outflow face, it must pass through the filter material. The channels are formed by alternately applying flat layers and pleated layers, such that all sides of the inflow-side channels open out into outflow-side channels.

Published international patent application no. WO 00/50149 discloses a filter element with first and second opposite flow faces. The filter medium has a pleated construction, such that the flutes are divided into an upper and a lower row of channels. The upper row of channels is sealed on the outflow end while the lower row of channels is sealed on the inflow end. However, the drawback in connection with the aforementioned SULEV/ULEV problem is that any hydrocarbons present in the intake manifold of an internal combustion engine may reach the environment when the engine or the vehicle is stopped.

SUMMARY OF THE INVENTION

It is thus an object of the present invention to provide an improved air filter system.

Another object of the invention is to provide an air filter system which obviates the aforementioned drawbacks of the prior art.

A further object is to provide an air filter system which can be disposed in the intake tract of an internal combustion engine and which further reduces pollutant emissions.

It is also an object of the invention to provide an air filter system which can limit the escape of hydrocarbon vapors from an internal combustion engine when the engine is stopped.

These and other objects are achieved in accordance with the present invention by providing an air filter system comprising an air filter element having an inflow face and an outflow face, the filter element comprising alternating flat and pleated layers which form channels, and the channels being alternately sealed at the inflow and outflow faces such that as air to be filtered flows from the inflow face to the outflow face, the air must pass through one of the layers. The air filter system of the invention further comprises an adsorber element comprising a honeycomb structure coated with activated carbon disposed adjacent said air filter element.

Additional advantageous embodiments are described in further detail hereinafter.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
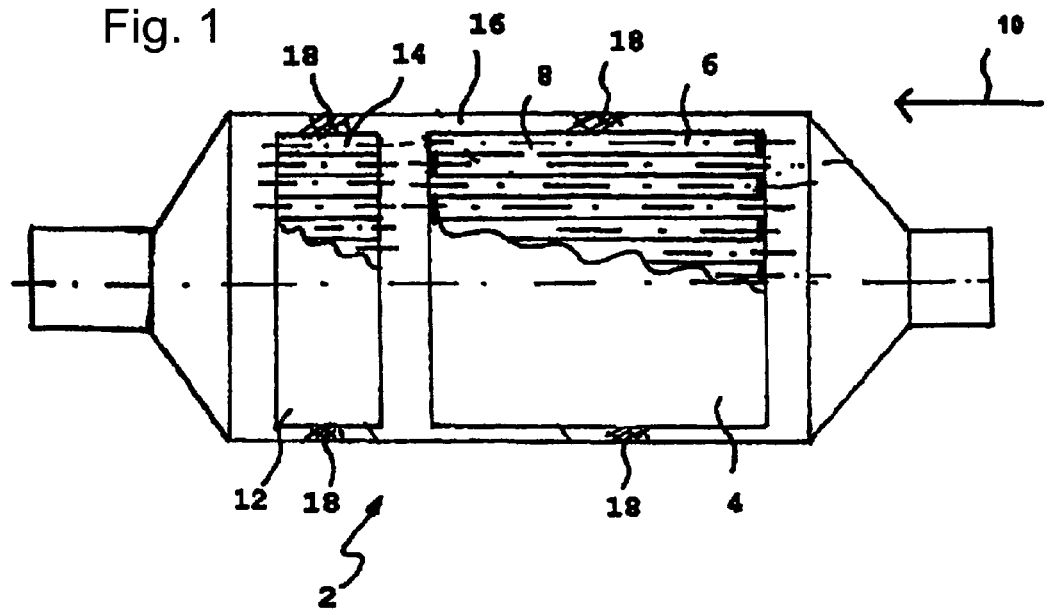
FIG. 1 is a is a schematic representation of an embodiment of the air filter system according to the invention showing the flow direction of the intake air.
Figure 2:
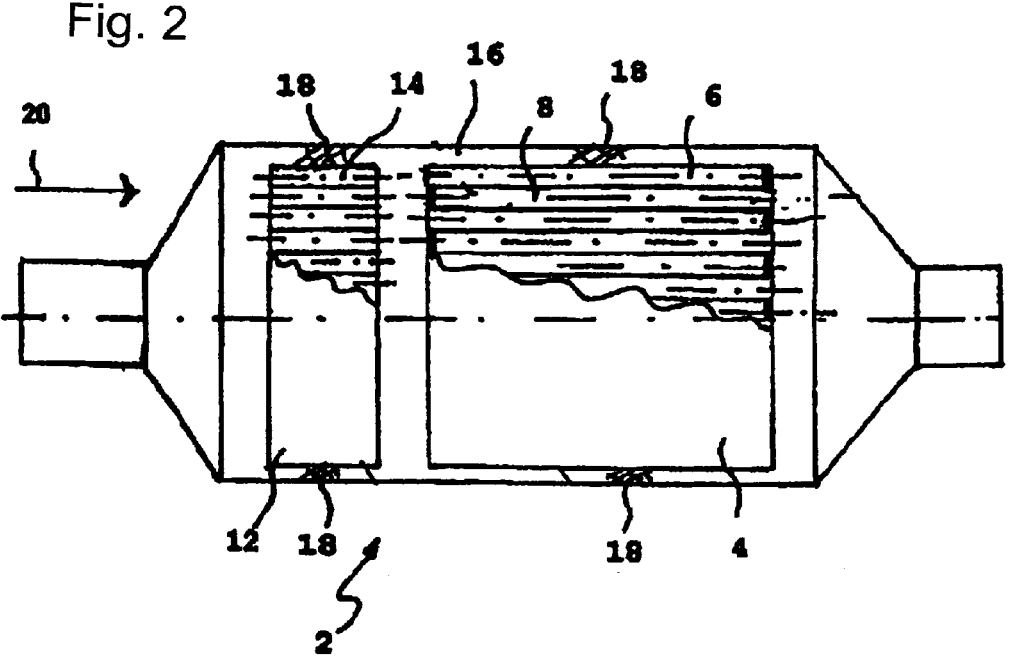
FIG. 2 is a is a schematic representation of an embodiment of the air filter system according to the invention showing the flow direction of the hydrocarbon vapors.

FIG. 1 is a schematic representation of an embodiment of the air filter system according to the invention showing the flow direction of the intake air through the air filter system. FIG. 2 is a schematic representation of an embodiment of the air filter system according to the invention showing the flow direction of the hydrocarbon vapors when the engine and/or vehicle is stopped.

As can be seen in FIG. 1, the air filter system 2 has a filter element 4 for end-face inflow, which has inflow and outflow-side channels 6, 8 that are alternately sealed. They can be sealed, for example, by an adhesive, particularly a hot-setting adhesive or hot-melt adhesive, before the filter is wound, i.e., in an amount just sufficient to seal the channels and at the same time glue the winding. The fluid to be filtered flows from the inflow face in the direction of arrow 10 into the channels 6 of the filter element 4 open on the inflow face and out of the filter element 4 in the same direction through the channels 8 of the filter element 4 that are open on the outflow face, so that the fluid is filtered.

Separately from the filter element 4 and adjacent thereto (downstream of the air filter element 4 as seen in inflow direction in the figure), an adsorber element 12 is disposed. This adsorber element 12 is a honeycomb structure coated with activated carbon. The adsorber element 12 also has channels 14 through which the fluid to be filtered flows. The channels 14, like the channels 6, 8 of the filter element 4, can be alternately sealed. In a preferred embodiment of the invention, however, the channels 14 are open to obtain more filter surface on the one hand and to reduce the pressure loss on the other hand.

Before the adsorber element 12 is coated with activated carbon, it is merely a carrier element for the activated carbon. By dipping the carrier element into an adhesive, it is first wetted with the adhesive mass; the activated carbon is then blown in. It is of course also possible to apply the activated carbon by dipping the carrier element into a slurry containing activated carbon and in this manner to transform the carrier element into the actual adsorber element 12.

The carrier element is preferably cylindrical, but may also have other shapes. For example, it may be a pleated pack, i.e., a rectangular element in which the individual layers are simply superimposed on one another. It may also be constructed from a plastic honeycomb structure or a plastic nonwoven material, i.e., a highly strengthened nonwoven material, which can be processed similarly to cellulose. The following description assumes a cylindrical shape, but it is within the skill of the art to devise other shapes based on the disclosure of this application.

The adsorber element 12 is preferably made of cellulose, which is particularly advantageous for cost reasons. Because of the cylindrical shape of both the filter element 4 and the adsorber element 12 selected in this example, the two elements can be combined in any length combination relative to one another and accommodated in a housing 16, so that the amount of activated carbon used is also variable. It is important that the length of the adsorber element be sufficient to adsorb the hydrocarbons which occur. As shown in the figures, the filter element 4 and the adsorber element 12 are sealed against the housing using seal members 18.

FIG. 2 shows the state when the engine is stopped. The gasoline-containing exhaust vapors contained in the engine diffuse through the system in the direction of the arrow 20 but are captured by the adsorber element 12 before they reach the environment. This prevents exhaust vapors from escaping into the environment when the engine is stopped.

Figure 3:
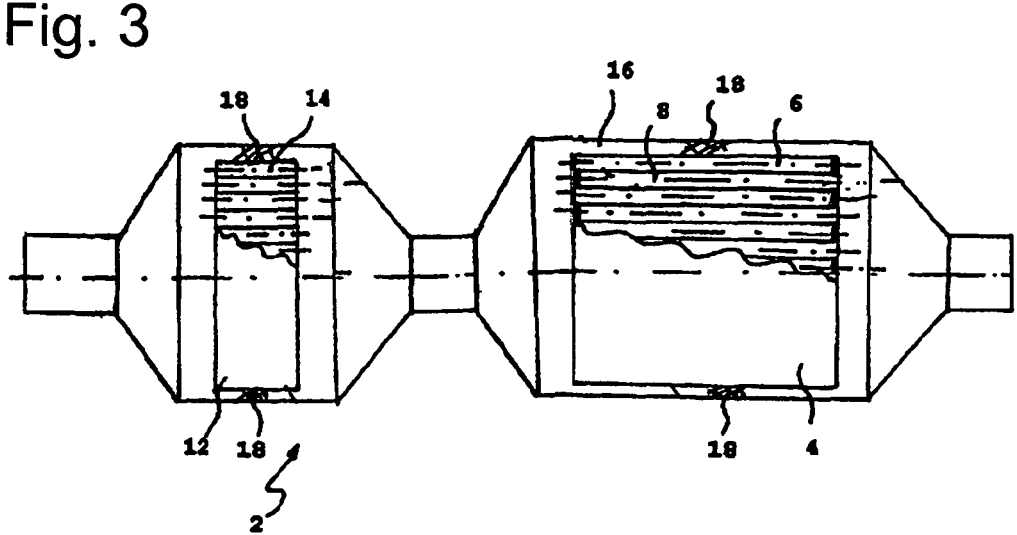
FIG. 3 is a schematic representation of an alternate embodiment of the air filter system according to the invention in which the filter element and the adsorber element are disposed in separate housings.

Alternatively, the adsorber element 12 may also be disposed in a separate housing as shown in FIG. 3. The arrangement according to the invention has the advantage that while the engine or the vehicle is stopped, hydrocarbons present in the intake tract cannot reach the environment but are adsorbed. As a result, emissions can be further reduced. A further advantage is the cost-effective manufacture of the air filter system according to the invention.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An air filter system comprising
a housing,
an air filter element having an inflow face and an outflow face, said filter element comprising alternating flat and pleated layers which form channels, and said channels being alternately sealed at the inflow and outflow faces such that as air to be filtered flows from the inflow face to the outflow face, the air must pass through one of the layers,
a hydrocarbon vapor adsorber element having an inflow face and an axially opposing outflow face and comprising a wound cellulose carrier coated folded and formed into a honeycomb shaped axial flow element with activated carbon adhesively bound to air flow channels therein and disposed adjacent said air filter element, said inflow face of said adsorber separated axially from and facing said outflow face of said air filter element,
wherein the adsorber element airflow channels substantially match a configuration of channels of the air filter element, the adsorber element airflow channels being substantially aligned with the air filter element channels,
wherein said housing is a common housing to both said hydrocarbon vapor adsorber element and said air filter element,
wherein the air filter element and the adsorber element are disposed within said common housing with said adsorber element airflow channels substantially aligned with said air filter element channels,
a first seal member disposed on a circumferential outer surface of said air filter element, said first seal member sealing said air filter element against an interior surface of said common housing, and
a second seal member disposed on a circumferential outer surface of said adsorber element, said second seal member sealing said adsorber element against said interior housing surface sealed by said first seal member.

2. An air filter system according to claim 1, wherein the adsorber element is disposed downstream of the air filter element in the direction of air flow through the filter element.

3. An air filter system according to claim 1, wherein adsorber element airflow channels are open at both ends.

4. An air filter system according to claim 1, wherein adsorber element airflow channels are alternately sealed.

* * * * *